United States Patent Office 3,563,923
Patented Feb. 16, 1971

3,563,923
OPTICALLY ACTIVE ADSORBENTS
David R. Buss, Kalamazoo, Mich., and Theodore Vermeulen, Berkeley, Calif., assignors to The Regents of the University of California
No Drawing. Filed July 26, 1967, Ser. No. 656,077
Int. Cl. C08f 27/00
U.S. Cl. 260—2.5                                     19 Claims

ABSTRACT OF THE DISCLOSURE

Adsorbents formed through the reaction of compounds containing an amino group and an asymmetric carbon, with a polymer having formyl groups spaced within an insoluble, swellable, cross-linked polymer matrix. These adsorbents are especially useful for the resolution of optical isomers.

---

This invention relates to the attachment of asymmetric sites to an insoluble resin matrix. More particularly, this invention is directed to optically active adsorbents formed by attaching primary amines to formylated, swellable, cross-linked polymers, their preparation, and their use in the chromatographic resolution of optical isomers.

Optical isomers (enantiomers) are encountered widely in nature, and are often needed for pharmaceutical purposes, for experimental biochemical studies, or as intermediates in organic synthesis of products destined for such uses. When an asymmetric-carbon structure is synthesized by living media, almost always only one of the two possible mirror-image isomers results. Thus optical activity is an innate property of life, and of most chemical materials of biological origin. As an ever-increasing number of syntheses of biochemical materials is conducted in vitro, a steadily growing need arises for supplies of synthetically prepared pure enantiomers.

However, optical isomers are difficult to purify as these "mirror image" compounds always have identical, indistinguishable physical properties. Extensive research efforts have been expended in attempts to resolve enantiomorphic pairs by their interaction with asymmetric adsorbents and/or optically active solvents. Under such conditions, a diastereoisomer is formed from each of the optical isomers. These diastereoisomers exhibit varying stability characteristics and can be isolated with conventional separation techniques. Once isolated, the diastereoisomer is dissociated to recover the desired isomer in a purified form.

Certain primary amines such as the optically active α-amino acids have been found to be especially valuable solvents when dissolved in water because of their high optical selectivity per unit weight for one isomer as opposed to the other. Thus, optically active isomers have been isolated indirectly by first forming diastereoisomers with an optically active amine and then separating the resulting diastereoisomers.

For this purpose also, various amine compounds have heretofore been attached to isolated spots within an insoluble, swellable copolymer matrix. For example, chloromethylated styrene-divinylbenzene copolymers, prepared by reacting the corresponding copolymer beads with chloromethyl methyl ether in the presence of a Friedel-Crafts catalyst, have been combined with simple optically active amine compounds. Employing this type of optically active insoluble adsorbent matrix, slight chromatographic racemate resolution has been accomplished through the aforementioned diastereoisomer formation.

However, the reaction of a halomethylated polymer with an amine is limited by several inherent disadvantages that create structural inhomogenuity within the matrix. For example, the reactivity of sterically-hindered or deactivated amines is low. Furthermore, additional cross-linking occurs within the polymer through reaction of the amine with more than one halomethyl group. This, of course, increases the cross-linking of the polymer and thus decreases its ability to swell. Also, the reaction conditions can be conductive to racemization of asymmetric amine compounds. Finally, the reaction of the halomethyl group is not confined to the amine groups, but also occurs, for example, at the carboxyl or hydroxyl sites.

It has now been found that substantially homogenous, optically active adsorbents can be obtained by reacting an expanded (swelled or porous), formylated, cross-linked, aromatic-containing polymer with a primary amine compound containing an asymmetric carbon to produce a polymer matrix having secondary amine groups attached to the matrix through the formyl sites. Furthermore, substantially all of the coupling occurs through formation of a Schiff's base between the formyl group and the primary amino group without interfering with the optical activity of the asymmetric carbon.

As a result of this "clean" reaction, a material having secondary amine groups attached to as little as a majority of the aromatic rings of the insoluble polymer exhibits resolution characteristics that are significantly superior to those found in prior-art materials formed by reacting a halomethylated copolymer with a primary amine. Because of the competing side reactions in the formation of this type of compound, the end product often has a small number of sites containing the desired secondary amine group. In this regard, it has been found that as many as 80 to 90% or more of the formyl sites in the insoluble resin matrix can be provided with a secondary amine group by the process of this invention.

In another aspect, the present invention is directed to the resolution of optical isomers through the use of these novel adsorbents. Thus the novel secondary-amine cross-linked polymers produced by the process of this invention are especially advantageous when employed as the packing for chromatographic studies on the resolution of optical isomers.

Specifically, the novel adsorbents of the present invention are obtained by treating a swellable, formylated, cross-linked aromatic-containing polymer with a primary amine compound such as an α-amino acid to form the corresponding Schiff's base (imine), then reducing the imine with a soluble reducing agent in a solvent capable of swelling the polymer matrix. In this manner, there is provided a novel adsorbent exhibiting the desired zwitterionic characteristics found in aqueous α-amino acid solvents, as well as providing the insoluble swellable matrix of a cross-linked aromatic-containing polymer.

Although it is not intended for the invention to be limited to any specific theoretical concept, it is thought that the following equations are representative of the reactions that occur when an amino acid ester is employed:

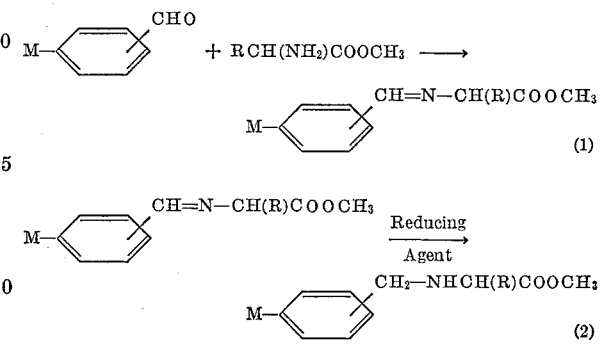

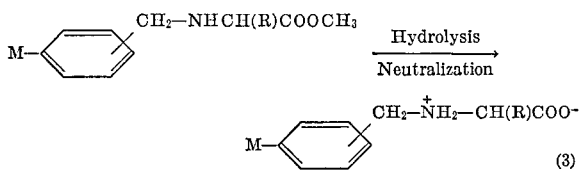
(3)

In the above equations, M represents the remainder of a formylated, cross-linked polymer matrix and R is meant to include any of a wide variety of substituents that are attached to the

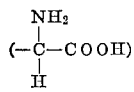

radical and form the well-known amino acid structures. As a result, asymmetric sites are isolated from each other and the polymer-matrix backbone while preserving the original zwitterionic character of the amino acid structure.

The term "amino acid" as used throughout the specification and claims is intended to include all those amine compounds having the general formula

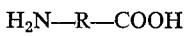

wherein R is an organic radical of up to 14 carbon atoms, and generally containing from 0–3 hetero atoms, bonded only to carbon and hydrogen atoms, having an atomic number of 7–17 and being selected from Groups V–VII of the Periodic Table of Elements.

The process of this invention is especially applicable to the formation of an insoluble, swellable, optically active adsorbent matrix by reaction of an optically active primary amine such as an α-amino acid or derivative thereof with any of the formylated, swellable, cross-linked polymers described in copending patent application Ser. No. 656,000 filed concurrently herewith. This is meant to include those compounds prepared by formylation of cross-linked copolymers formed from an aryl olefin, preferably carbocyclic, and an addition-polymerizable aryl diolefin, wherein each of the aryl groups contain from 6 to 12 carbon atoms, and particularly 6 annular carbon atoms. Those copolymers wherein direct bonding of the olefinic group to an annular carbon atom is present are preferred. In addition, it is intended to include those cross-linked polymers having side chains such as amino, chloro and aliphatic groups bonded directly to the annular carbons provided that such side chains do not interfere with or detrimentally affect the formylation. For convenience of illustration, the following disclosure will be directed to the use of a formylated resin copolymer wherein the copolymer is formed from styrene and about 4% divinylbenzene.

In preparing an insoluble swellable adsorbent from an optically active α-amino acid and the aforementioned insoluble, formylated, cross-linked, swellable copolymer, it is particularly desirable to preserve the switterionic property of the α-amino-carboxyl structure. Preservation of the α-amino acid as a switterion is most easily accomplished by employing an ester or amide corresponding to the desired amino acid. Furthermore, it has been found that the attachment of the amino acid is more easily accomplished when the uncharged ester or amide is employed. Once the attachment of the α-aminocarboxyl structure to the insoluble formylated matrix has been completed, the ester or amide can be easily hydrolyzed to provide the corresponding asymmetric zwitterionic structure.

As was discussed in detail in copending application, Ser. No. 656,000 supra, it is necessary to employ a solvent system that will swell the cross-linked polymer to provide access to the aromatic rings for producing the formylation reaction. In the instant process, the solvent system must similarly produce sufficient swelling to provide access to the formyl sites for the amine for preparation of the imine precursor. In addition, however, in the preparation of the corresponding amine the solvent system must also be suitable for dissolving the imine reducing agent so that the agent will be able to penetrate the insoluble resin matrix. Alternately, a porous polymer structure must be used that provides a large amount of internal pore surface that is accessible and able to react. It is evident that for either swellable or porous polymers separate solvent systems may be employed for accomplishing the Schiff's base formation and subsequent reduction to the amine.

Solvents which will swell the formylated resin include chloroform, ethylene chloride, benzyl alcohol, dioxane, dimethyl formamide, acetone, benzene-methanol, benzene, dimethyl sulfoxide, and the like. Aliphatic alcohols such as methanol, i-propanol and n-propanol do not produce the desired volume of swelling unless the polymer is first swollen with another solvent and then rinsed with the alcohol. Thus solvents for the Schiff's base formation and/or subsequent reduction to the amine may be chosen from them.

Although the process conditions are not critical to obtaining the desired attachment of the amine compound to the formylated copolymer, it has been found that the imine formation can be accomplished at lower temperatures, i.e., below 60° C. and preferably at about 30° C. Thus, the likelihood of amino acid racemization or undesired side reactions with itself is minimized, and may be completely inhibited. Of course, it will be apparent to those skilled in this art that the yield, i.e., extent of attachment of amine compounds within the formylated copolymer matrix, may be modified by varying the time, temperature, pressure, and the amount and method of addition of reagents employed. In addition, the amount of solvent employed must be at least sufficient to provide for complete swelling of the formylated polymer matrix so that the α-aminocarboxyl groups can diffuse into the formylated polymer matrix. However, excessive amounts of solvent have not been found to be detrimental to the attachment reaction.

The reducing agents useful for converting the imine to the corresponding amine are limited to those that (1) are soluble in a solvent suitable for swelling the cross-linked resin matrix; (2) penetrate the swollen matrix and (3) are relatively mild so that reduction of other groups within the amino acid, such as the carboxyl or ester group, is prevented. Sodium borohydride has been found to be particularly valuable in the process of this invention. Other agents that have been found useful under certain circumstances include lithium aluminum hydride, diisobutyl aluminum hydride, and the like.

With regard to the conditions employed during the reduction reaction, here again actual amounts of reducing agent, as well as temperature and pressure can be varied widely. Although it is preferred that stoichiometric amounts of the reducing agent and imine be utilized, amounts of reducing agent in excess may be employed, i.e., from 1.5–5.0 times that which is stoichiometrically required, where it is desirable to assure complete reduction.

When an amino acid ester or amide is employed, hydrolysis of the coupled derivative to the optically active zwitterionic form can be accomplished under various conventional reaction conditions. However, mild conditions are preferable to avoid side reactions such as racemization that might adversely affect the purity of the secondary amine coupling.

Chromatographic resolution employing the optically active adsorbents of this invention is accomplished in the manner well known to those of skill in this art. Thus, in operation, a column is packed with the adsorbent. The adsorbent bed is then saturated with an elutant such as methanol. The racemate, diluted with the elutant, is fed into the saturated bed. Flow of pure elutant is then started and samples of the eluent are collected periodically. The optical isomer that forms the more stable diastereoisomer with the adsorbent will be retained within the bed for a longer period of time. As a result, separation of the enantiomers is obtained.

To further illustrate this invention, the following examples are provided. It should be understood that the details thereof are not to be regarded as limitations as they may be varied as will be understood by one skilled in this art.

EXAMPLE I

Synthesis of optically active adsorbent

L-tyrosine methyl ester hydrochloride (11.8 g., 51.0 mmoles) was dissolved in 30 ml. methanol in a 100 ml. flask, then neutralized with 21.7 ml. of 2.30 N methanolic LiOH (50.0 mmoles). The ester was concentrated to 25 ml. by vacuum evaporation and transferred to a 50 ml. flask containing a magnetic stirring bar, whereupon the ester suddenly precipitated spontaneously as a slurry of fine white crystals. Next, 8.00 g. of formylated polystyrene divinylbenzene beads (4% crosslinked, 150–200 mesh, capacity 5.3 mmoles aldehyde per gram) and 16 ml. of benzene were added to the flask. In 36 hours' time at 25° C., the crystallized ester redissolved completely due to its chemical reaction; the yellow color of the beads remained unchanged.

Reduction of the imine beads followed, after rinsing beads on a filter with methanol, and transferring them to a 100 ml. flask containing a magnetic stirring bar. The reduction solvent consisted of 20 ml. benzene, 40 ml. methanol, and 1 ml. 2.3 N methanolic LiOH to suppress $NaBH_4$ decomposition. Solid $NaBH_4$ (5 g.) was added in portions to the flask cooled in an ice bath over a 3-hour period during which the beads turned light yellow and then light green. The flask was then allowed to warm to 25° C., and after 12 hours longer, the beads were colorless and hydrogen could still be seen evolving slightly from the solution. After rinsing the beads with water and methanol on a filter, they were treated with 1:1 water-acetone solution 1 N in HCl to decompose any remaining $NaBH_4$, a process which turned the white beads a light yellow and caused hydrogen gas to evolve.

Hydrolysis of the attached L-tyrosine ester was then accomplished by treating the beads in 5% aqueous NaOH for 3 hours at 25° C. After filtering, washing, and rinsing, the beads were air-dried on the filter. The product weighed 15.8 g., part of which was attributed to water of hydration.

The capacity and percent conversion were measured by taking a weighed quantity of beads, treating them with aqueous NaOH to convert to base form, rinsing off excess soluble base, equilibrating beads with known amount of excess acetic acid in 1 N KCl, and back titrating the filtered off acetic acid solution with standard base. The pK's of amino acids are such that acetic acid protonates the amines but not the carboxylate groups. The conversion found was 90% of formyl groups initially present; capacity, 2.4 meq. L-tyrosine per gram dry resin, 1.9 meq. per ml. for beads in water, and 1.4 meq. per ml. for beads in methanol.

Comparable data for other resins so made are given in Table I.

EXAMPLE II

Resolution of optical isomers

DL-mandelic acid was partially resolved chromatographically using a .87 cm. diameter column packed with 9.8 g. (24 mmoles of attached amino acid) L-tyrosine resin in methanol which produced a bed 27.5 cm. high. The column was preconditioned by washing with 1 N methanolic acetic acid followed by pure methanol. A feed containing 24 mg. DL-mandelic acid per ml. methanol was then fed to the column at a flow rate of 3 ml. per hour, and samples collected by an automatic fraction collector at hour intervals.

The results of the experiment are shown in Table II. The individual fractions were analyzed for their total mandelic acid content and optical rotation. From these measurements the specific rotation of the mandelic acid was calculated; the $[\alpha]_D$ shown in the table includes a correction for slight optical activity of the feed solution itself. Based on a $[\alpha]_D$ of 153 for D-mandelic acid, fraction 7 has a 2% enhancement of D-mandelic acid over that in the feed.

Measurement of the observed rotations was accomplished through the use of a Bendix Automatic Polarimeter, Model 143A, and a 2 cm. cell. Concentrations of mandelic acid were measured after the optical rotation measurements by UV absorption at 257.4 m$\mu$ with a Beckman Model DU–2 spectrophotometer after first being diluted to 100 ml.

TABLE II.—RESOLUTION OF DL-MANDELIC ACID ON L-TYROSINE RESIN COLUMN

| Fraction: | Mandelic acid | | | Observed rotation, $\alpha_d$ 1=2 cm. | Corrected specific rotation, $[\alpha]_d$ |
|---|---|---|---|---|---|
| | Ml. | Mg. | Mg./ml. | | |
| 1–4 | 12.60 | 0 | 0 | 0.0000 | 0 |
| 5 | 3.10 | 0.4 | .1 | 0.0000 | 0 |
| 6 | 3.50 | 1.0 | .3 | 0.0000 | 0 |
| 7 | 3.40 | 11.2 | 3.3 | +0.0020 | +2.9 |
| 8 | 3.50 | 73.0 | 20.9 | +0.0050 | +1.0 |
| 9 | 3.25 | 71.9 | 22.1 | +0.0008 | 0 |
| 10 | 2.95 | 71.6 | 24.2 | +0.0008 | 0 |
| Feed | 2.25 | 53.8 | 24.0 | +0.0008 | |

Although the foregoing invention has been described in some detail by way of illustration and example for purposes of clarity of understanding, it is understood that certain changes and modifications may be practiced within the spirit of the invention as limited only by the scope of the appended claims.

The invention described herein was made with the aid of United States Public Health Service funds.

What is claimed is:

1. A process for preparing an amine-containing optically active adsorbent suitable for resolving enantiomorphic pairs comprising: forming an imine by reacting an amino acid with a formylated, cross-linked, swellable, interpolymer of an aryl-olefin having aryl groups of from 6–12 carbons and an addition-polymerizable aryl-diolefin having aryl groups of 6–12 carbons, in the presence of solvent suitable fore swelling said polymer to provide access of said amine group to the formyl groups within said polymer; and subjecting said imine to a reducing

TABLE I.—SYNTHESIS OF AMINO ACID RESINS WITH FORMYLATED POLYSTYRENE

[4% divinylbenzene, 150-200 mesh, capacities as shown]

| Amino acids (mmoles) | Salts added (mmoles) | Solvent (ml.) | Formylated beads, g. (mmoles CHO) | Temp. of reaction, °C. | Time (hrs.) | Conversion, percent |
|---|---|---|---|---|---|---|
| L-lysine·HCl (6.03) | LiOH (5.9) | BzOH (25) | 0.50 (3.25) | 60 | 3 | 4.1 |
| L-tyrosine (6.02) | LiOH (5.9) | ---do--- | 0.50 (3.25) | 54 | 3 | 1.6 |
| L-tyrosine Me ester·HCl (6.0) | LiOH (5.9) | ---do--- | 0.50 (3.25) | 58 | 3 | 48.8 |
| L-tyrosine Me ester·HCl (6.1) | LiOH (5.9) | Benzene (20), MeOH (5) | 0.50 (2.70) | 49–57 | 8 | 70.8 |
| Do | LiOH (5.9) | ---do--- | 0.50 (2.70) | 29 | 8 | 53.4 |
| L-leucine Me ester·HCl (6.1) | LiOH (5.9) | ---do--- | 0.50 (2.70) | 25 | 12 | 51.0 |
| L-aspartic acid dimethyl ester·HCl (6.1) | LiOH (5.9) | ---do--- | 0.50 (2.70) | 25 | 12 | 43.5 |
| L-tyrosine Me ester·HCl (51.0) | LiOH (50.0) | MeOH (20), Benzene (16) | 8.00 (43.0) | 25 | 36 | 90 |
| L-glutamic acid dimethyl ester·HCl (8.0) | LiOH (7.0) | Benzene (25), methanol (10) | 0.50 (3.30) | 25 | 23 | 31 | agent soluble in said solvent to form a secondary amine corresponding to said imine.

2. A process in accordance with claim 1 wherein said amino acid is an α-amino acid or the corresponding ester or amide having the structure

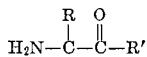

wherein R is an organic radical of up to 14 carbons, and containing from 0–3 hetero atoms having an atomic number of from about 7–17 and being selected from Groups V to VII of the Periodic Table of Elements and R' is a monovalent radical selected from hydroxy, amino and alkoxy of up to 5 carbons.

3. A process in accordance with claim 2 wherein R' is an alkoxy radical, said process being further characterized by subsequently hydrolyzing said secondary amine to replace said alkoxy radical with a hydroxy radical so that said absorbent will exhibit zwitterionic activity.

4. A process in accordance with claim 2 wherein R' is an amino radical, said process being further characterized by subsequently hydrolyzing said secondary amine to replace said amino radical with a hydroxy radical so that said adsorbent will exhibit zwitterionic activity.

5. A process in accordance with claim 3 wherein the alkoxy radical is methoxy.

6. A process in accordance with claim 1 wherein said amine is an amino acid containing an α-amino group.

7. A process in accordance with claim 6 wherein said amine is L-tyrosine.

8. A process in accordance with claim 1 wherein said reaction is carried out at about room temperature.

9. A process in accordance with claim 1 wherein said reducing agent is sodium borohydride.

10. The product formed by the process of claim 1.

11. A swellable, cross-linked, insoluble amine-containing resin composition comprising an interpolymer of an aryl-olefin having aryl groups of from 6–12 carbons and an addition-polymerizable aryl-diolefin having aryl groups of from 6–12 carbons, said composition being further characterized by the replacement of a hydrogen atom on an annular carbon of at least a majority of the aryl groups by an amine-containing radical, said radicals containing a secondary amine and having the structure

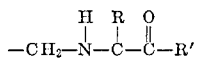

wherein R is an organic group having from 1–14 carbons, and containing from 0–3 hetero atoms having an atomic number of from about 7–17 and being selected from Groups V to VII of the Periodic Table of Elements and R' is a radical selected from hydroxy, an alkoxy of up to 5 carbons and amino.

12. The amine-containing resinous composition of claim 11 wherein said amine-containing radical of the structure shown is attached to at least about 80% of said aryl groups.

13. The amine-containing resinous composition of claim 11 wherein R is a p-hydroxy tolyl radical.

14. The amine-containing resinous composition of claim 11 wherein R is an isopropyl radical.

15. The amine-containing resinous composition of claim 11 wherein R is a carboxylmethyl radical.

16. The amine-containing resinous composition of claim 11 wherein R is a 2-carboxylethyl radical.

17. The amine-containing resinous composition of claim 11 wherein R' is alkoxy.

18. The amino-containing resinous composition of claim 17 wherein R' is methoxy.

19. In a process for at least partially resolving enantiomorphic pairs of organic compounds into optically active fractions by passing the pairs diluted in a solvent through a bed of a porous packing solid saturated with said solvent and eluting said pairs with an additional amount of a solvent, the improvement comprising introducing the resin composition set forth in claim 11 as said porous packing solid.

References Cited
UNITED STATES PATENTS

| | | | |
|---|---|---|---|
| 2,953,547 | 9/1960 | Patterson | 260—73 |
| 2,993,012 | 7/1961 | Wolf | 260—2.1 |
| 2,846,406 | 8/1958 | Kleiner | 260—2.1 |

JOSEPH L. SCHOFER, Primary Examiner

R. S. BENJAMIN, Assistant Examiner

U.S. Cl. X.R.

260—30.8, 32.4, 33.8, 72, 72.5, 88.2 708, 476, 525